United States Patent [19]

Ruder et al.

[11] 3,922,149

[45] Nov. 25, 1975

[54] OXYGEN AIR ENRICHMENT METHOD

[75] Inventors: Joseph M. Ruder; Thomas L. Iles, both of Palos Verdes Peninsula, Calif.

[73] Assignee: The Garrett Corporation, Los Angeles, Calif.

[22] Filed: Jan. 30, 1974

[21] Appl. No.: 438,062

[52] U.S. Cl............................................. 55/21; 55/25
[51] Int. Cl.² ......................................... B01D 53/04
[58] Field of Search ............... 55/21, 25, 33, 58, 62, 55/74, 75, 163, 389, 68

[56] References Cited
UNITED STATES PATENTS

| | | | |
|---|---|---|---|
| 2,955,673 | 10/1960 | Kennedy................................ | 55/33 |
| 3,149,934 | 9/1964 | Martin................................... | 55/62 |
| 3,280,536 | 10/1966 | Berlin.................................... | 55/58 |
| 3,399,510 | 9/1968 | Kauer, Jr. et al...................... | 55/33 |
| 3,659,399 | 5/1972 | Kauer, Jr. et al...................... | 55/33 |

*Primary Examiner*—John Adee
*Assistant Examiner*—Ethel R. Cross
*Attorney, Agent, or Firm*—Alfons Valukonis; Joel D. Talcott; Albert J. Miller

[57] ABSTRACT

Inlet air under pressure is supplied to a container having a bed of sorbent material wherein all gaseous air components are adsorbed in varying amounts by the sorbent material, with oxygen being the least adsorbed. Oxygen enriched air flowing from the container is stored and can be utilized at the same time for breathing purposes. Supply of the pressurized inlet air to the container is inversely controlled in accordance with pressure variations of the stored enriched air to limit production of enriched air to demand. Periodically the container is opened to the outside atmosphere, which is at a lower pressure than the inlet air pressure, and some of the stored enriched air is passed through the container to remove adsorbed gases from the sorbent bed and purge them to the outside atmosphere. The sorbent bed is thus cleansed of adsorbed gases and prepared to receive more inlet air under pressure from which gaseous components can be further adsorbed and inlet air enriched.

4 Claims, 2 Drawing Figures

3,922,149

OXYGEN AIR ENRICHMENT METHOD

BACKGROUND OF THE INVENTION

This invention relates generally to air enrichment method and apparatus, and in particular to oxygen air enrichment method and apparatus.

Heretofore, oxygen for breathing purposes was supplied to aircraft crew, for example, from stored oxygen containers aboard the aircraft. When needed, the oxygen was supplied to the crew diluted with cabin air, which could be contaminated. Medical oxgen is also usually stored in the gaseous or liquid state, in high pressure containers, and used when needed, diluted with surrounding atmospheric air for the treatment of patients. One problem associated with such oxygen enriched breathing arrangements is that refilling of the storage tanks requires a central processing plant, as well as large equipment and transportation capacities to provide the needed supply of oxygen. Accordingly, a need has been demonstrated for providing oxygen enriched air for breathing purposes without relying on stored containers of oxgen and diluting systems.

Examples of prior systems of interest are revealed in U.S. Pat. No. 2,944,627 to Skarstrom; U.S. Pat. No. 3,069,830 to Skarstrom; U.S. Pat No. 3,138,439 to Skarstrom; U.S. Pat. No. 3,164,454 to Wilson; U.S. Pat. Nd. 3,507,097 to Crowley et al; U.S. Pat. No. 3,533,221 to Tamura; and U.S. Pat. No. 3,564,816 to Batta.

Prior art air enrichment approaches do not make provision for a reduced desorb pressure when purging the sorbent bed of adsorbed gases in preparation for furthering adsorption by the bed. Prior approaches appear to stress the need for providing a large differential between the adsorb and desorb pressures, and to achieve that differential, provision is made for merely increasing the adsorb pressure. It has been observed that provision for merely increasing adsorb pressure only increases the amount of inlet air required to abtain a fixed amount of enriched air output. It has also been observed that providing for a decreased desorb pressure improves the quality of the enriched air output. The oxygen enriched air passing through the container sorbent bed at low pressure removes more of the adsorbed gases in the sorbent bed, on a pound-for-pound basis, than could high pressure inlet air, which provides for increased quality of the oxygen enriched air output.

SUMMARY OF THE INVENTION

Air enrichment method and apparatus wherein there is provided for the adsorbing of constituent gases from pressurized inlet air with a sorbent bed to provide air enriched with one of the gases, and desorbing the adsorbed gases from the sorbent bed with some of the enriched air at a pressure lower than the pressure of the inlet air to prepare the bed for further adsorption of inlet air constituent gases.

Numerous advantages and features of the present invention are readily apparent. The present invention eliminates the need for tanks of stored oxygen, which contributes to a more rapid turn-around time in the case of aircraft. Other advantages include greater aircraft range, since on-board oxygen tank storage capacity is not limiting, and greater flexibility of aircraft deployment, due to the elimination of base oxygen generating equipment. The need for ground based equipment at airports for re-pressurizing the oxygen tanks in eliminated. Another advantage is that present diluter-demand crew breathing oxygen systems, presently in use, can be replaced by the present invention.

An important feature of the present invention is that no dilution of enriched air with aircraft air, for example, is necessary. The method and apparatus automatically provides for the highest attainable oxygen concentration in the enriched air produced by limiting the enriched air product to the demand. The enriched air output quality is regulated by controlling the sorbent bed purge flow as a function of the ambient pressure existing outside, for example, the aircraft cabin. The amount of sorbent bed purge flow required is reduced by delaying the start of purge flow until after the sorbent bed has reached the desorption pressure. The present invention is self-contained, and can be used with aircraft bleed air systems.

DETAILED DESCRIPTION OF THE PREFERRED EMBODIMENT

Figure 2:
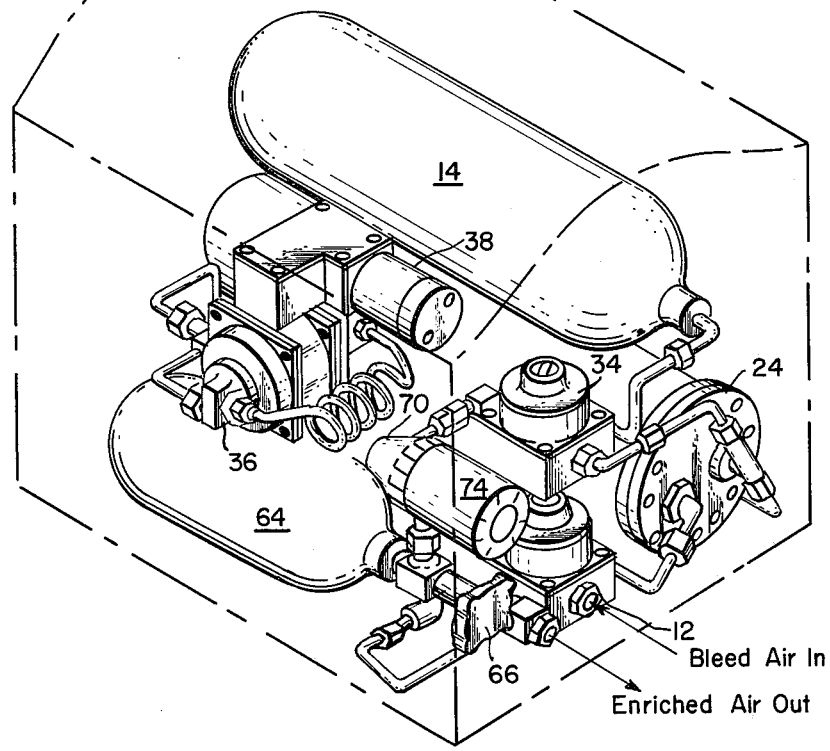
FIG. 2 is a perspective showing of the arrangement of FIG. 1, assembled and packaged for use.
Figure 1:
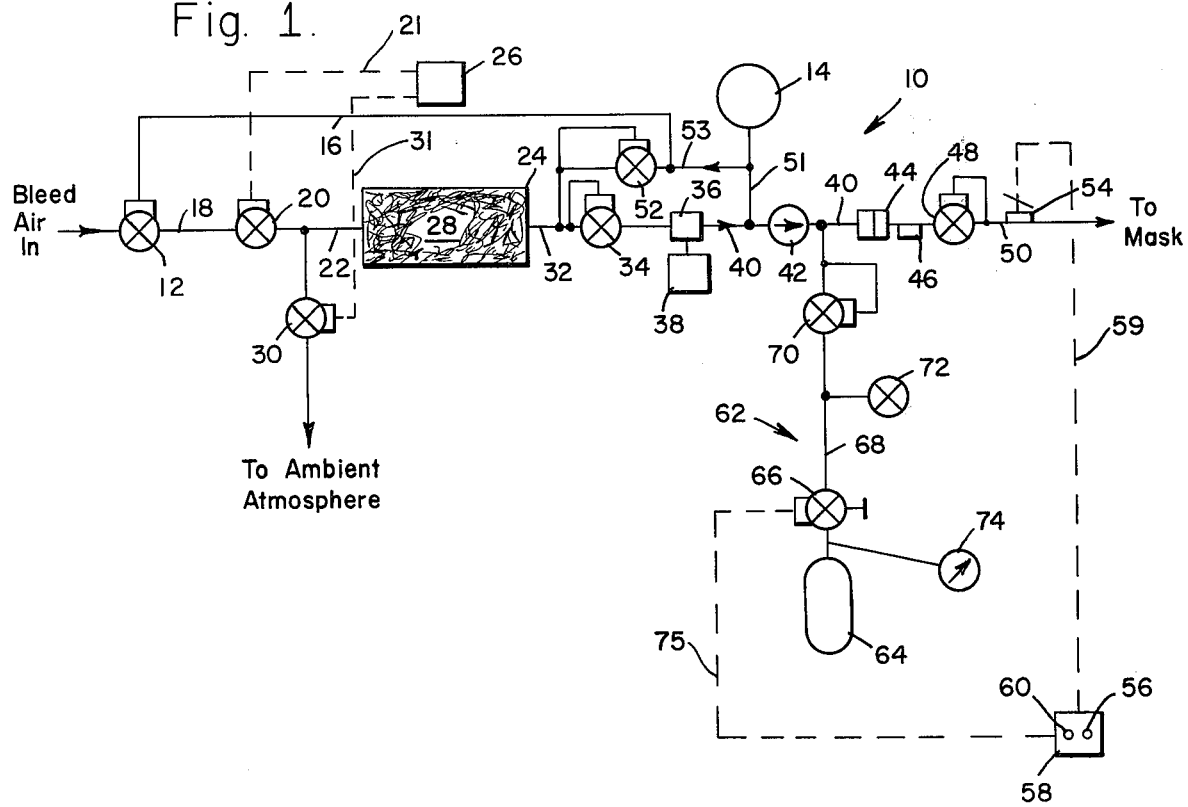
FIG. 1 is a schematic showing of an arrangement embodying the air enrichment system of the present invention.

Reference is now made to FIG. 1 wherein the air enrichment apparatus 10 of the present invention is illustrated as having an inlet air flow control valve 12 that is adapted to be connected to a source of pressurized air (not shown). Valve 12 is fluid pressure actuated, and responds to the pressure variations of the oxygen enriched air stored in a tank 14 through a conduit 16. Valve 12 adjusts to a closed position as the pressure increases in tank 14, and to an opened position as the pressure decreases in the tank, thus controlling flow of the inlet air in response to fluid pressure, as will be hereinafter more fully described.

The source (not shown) of inlet air could be the compressor of an aircraft engine supplying bleed air, or an auxiliary compressor carried by the aircraft supplying compressed air. Preferably, for example, the constant pressure of the inlet air should be in the range of 20 to 100 psia.

Valve 12 is connected by a conduit 18 to an inlet air shut-off valve 20. A conduit 22 connects valve 20 to a container 24. Valve 20 is electrically operated, and is adapted to be connected to a controller 26 by an electrical connection line 21.

Container 24, sorbent can be fashioned from steel, or the like, is provided with a sorbent bed 28.

Sorbent bed 28 can be a molecular sieve type material, or like substance, which is capable of adsorbing all the constituent gases in the inlet air without chemical reaction, with oxygen being the least adsorbed of all gases. One example of suitable material comprising sabent bed 28 would be 1/16 inch pellets of type 5A sieve.

A purge valve 30 connects conduit 22 to the ambient atmosphere, which can be the medium surrounding the aircraft cabin. Valve 30 is also an electrically operated solenoid valve, likewise adapted for operable electrical connection to controller 26 by a line 31.

Controller 26 can be a solenoid program timmer, or the like, having a cycle time whereby valves 20 and 30 can be sequentially actuated in a predetermined manner, to be hereinafter more fully described. Controller 26 could be provided with cycle times of 30, 40 or 50 seconds, for example.

A conduit 32 connects the container 24, an enriched air flow control valve 34, and an air compressor 36, which is driven by an electric motor 38. Valve 34 is fluid pressure actuated, and responds to air pressure in container 24 through conduit 32. When pressure in container 24 is below a predetermined magnitude, valve 34 is in a closed position. When pressure in container 24 is above the predetermined magnitude, valve 34 is in an opened position.

A conduit 40 interconnects a valve 42, compressor 36, a check valve 42, a quick-disconnect coupling 44 and a demand regulator valve 48. A conduit 50 connects regulator valve 48 to the crewman mask (not shown). Oxygen is supplied for bail-out, from a bail-out tank (not shown), through a supply connection 46, located in conduit 40. A conduit 51 connects conduit 40 at the output side of compressor 36 to tank 14.

Regulator valve 48 is pressure actuated and is adapted to open when the pressure in conduit 50 attains a predetermined value to supply the crewman mask with enriched air from tank 14. Regulator valve 48 is a very sensitive pressure regulator which senses pressure in the crewman mask through conduit 50. During crewman inhalation, pressure in the mask is reduced slightly, and valve 48 opens allowing enriched air to flow to the mask. During crewman exhalation, mask pressure increases slightly, and demand regulator 48 closes. Exhaled gases are allowed to escape from the mask through an exhalation valve (not shown) in the mask.

Compressor 36 is adapted to be constantly driven by motor 38, as long as the air enrichment apparatus 10 is in operation. Preferably, compressor 36 should be capable of compressing the enriched air flowing from container 24 to pressure values between 70 to 120 psia to satisfy the range of inlet pressures typically required at the inlet side of regulator valve 48. It will be appreciated by one skilled in the art that if the air inlet pressure is sufficiently high to provide a range of 70 to 120 psia, compressor 36 and motor 38 can be eliminated from the air enrichment apparatus 10. In that event valve 34 would be replaced by a simple check valve (not shown).

A purge control valve 52 is provided in a conduit 53 which interconnects conduits 32 and 51 for purging sorbent bed 28 of adsorbed gases. Valve 52 is also fluid pressure actuated, and responds to fluid pressure within container 24 through conduit 32. When pressure in container 24 is above a predetermined level, valve 52 is in a closed position, but when pressure in container 24 is below the predetermined level, valve 52 is in the opened position.

An oxygen sensor 54 is suitably positioned in conduit 50 for measuring oxygen partial pressure. Sensor 54 could be a polarographic oxygen sensor, or the like, and is used to provide a signal indicative of low oxygen concentration in the enriched air due to failure of the air enrichment apparatus 10. In such event, a warning indicator 56, in the form of an incandescent lamp, for example, on a control panel 58, is adapted to be lit by a suitable electrical circuit (not shown) in response to a signal from sensor 54, through a suitable electrical connection 59. Another indicator 60, similar to the indicator 50, also provided on control panel 58, is adapted for illumination by an altimeter and electrical circuit arrangement (not shown) at altitudes between, say 11,500 to 13,000 feet, to alert the crewman that the mask should be used.

An emergency oxygen supply system 62 is also provided which consists of a tank 64 filled with gaseous oxygen. A valve 66 supplies oxygen from tank 64, through conduit 68, and pressure regulator valve 70 to conduit 40, when needed. A relief valve 72 is connected to conduit 68. A gage 74 provides pressure information of the oxygen in tank 64. During emergency aircraft cabin decompression, oxygen can be supplied to the crewman mask by simply manually activating valve 66. Valve 66 is also adapted for automatic opening by means of an electrical signal provided in line 75. Line 75 is suitably connected to valve 66 and the electric circuit (not shown), hereinbefore described regarding warning indicator 56. Valve 66 opens when warning indicator 56 is actuated.

In operation of the air enrichment apparatus 10, let container 24 be fashioned from stainless steel, 3 inches in diameter, 14 inches long, and containing 3.00 pounds of type 5(1/16 inch pallets) molecular sieve. Inlet bleed air is provided at a pressure of 20 psia, and the ambient, or outside cabin pressure is 3.7 psia. Controller 26 is adapted to provide a cycle of 40 seconds. Initially, valve 12 is in the fully opened position. Valves 20 and 30 are programmed by controller 26 to opened an closed position, respectively. Valves 34 and 52 are in closed and opened positions, respectively.

Inlet air passes through open inlet valve 12, conduit 18, valve 20, and conduit 22 into container 24 where all the inlet air constituent gases are adsorbed in varying amounts by sorbent bed 28, with oxygen being the least adsorbed. When the pressure in container 24 increases to 4.2 psia, valve 52 closes. When the pressure in container 24 increases to 18 psia, valve 34 opens, and enriched air, flowing from container 24, is passed on through conduit 51 to tank 14, and its pressure increased to 75 psia by compressor 36. All the while oxygen enriched air can be used by the crewman through check valve 42, and demand regulator 48.

As the pressure in tank 14 increases, valve 12 adjusts toward its fully closed position in response to this increased pressure, thus permitting less and less pressurized inlet air into container 24, and producing less and less enriched air passing through valve 34. However, the lower the amount of pressurized inlet air allowed into container 24, the higher the oxygen concentration will be in the enriched air flowing through valve 34. Thus, because the quality, or oxygen percentage of the enriched air, is inversely proportional to flow, by inversely controlling the flow of inlet air to the apparatus 10 as a function of fluid pressure in tank 14, the enriched air produced is matched to the crewman demand, and the oxygen concentration in the enriched air output can be maintained at a sea level equivalent.

After 50 percent of the cycle time of 40 seconds, controller 26 closes valve 20, and opens purge valve 30, thus opening container 24 to the ambient, or outside atmosphere of the aircraft. When the pressure in container 24 falls to 17 psia, valve 34 closes. At a pressure of, say 3.8 psia in chamber 24, valve 52 opens, allowing enriched air to flow from tank 14 through valve 52, bed 28, conduit 22, and valve 30 to the ambient atmosphere, thus purging bed 28 of adsorbed gases.

When pressure in tank 14 falls below 65 psia, valve 12 starts to adjust toward its opened position. Controller 26 opens valve 20 and closes valve 30. Pressurized inlet air again flows into container 24 where the constituent gases are adsorbed, and the hereinbefore described cycle again begins. Enriched air at a rate of about 0.5 lb/hr., with an oxygen concentration of approximately 73 percent can be thus produced and delivered at the crewman mask.

While a specific embodiment of the invention has been illustrated and described, it is to be understood that it is provided by way of example only and that the invention is not to be construed as being limited thereto, but only by the proper scope of the following claims.

What we claim is:

1. An air enrichment method comprising the steps of:
  supplying pressurized inlet air to a container having a sorbent bed;
  storing inlet air enriched with one of its constituent gases flowing from the container;
  inversely controlling the step of supplying pressurized inlet air in accordance with pressure variations of the stored enriched inlet air; and
  cyclically purging the sorbent bed by a timer means that periodically exposes the sorbent bed to a low pressure zone.

2. The method of claim 1 further comprising: simultaneously conducting a portion of ennriched air from the container for use and another portion to the storage tank.

3. The method of claim 1 further comprising:
  periodically passing some of the stored enriched inlet air through the container at a pressure lower than the pressure of the pressurized inlet air to purge the bed of adsorbed gases.

4. A method of enriching air by passing air through a chamber containing material capable of adsorbing nitrogen from the air while allowing oxygen to pass through the chamber comprising the steps of:
  supplying air from a source at high pressure to the chamber through an inlet conduit during a first time interval;
  conducting air from the chamber to a low pressure zone during a second time interval;
  conducting enriched air through a supply conduit to a tank during a portion of the first time interval when the pressure in the chamber is substantially at its maximum valve, the supply conduit means including flow control valve means for conducting enriched air from said tank to said chamber during the portion of said second interval when the fluid pressure in said chamber is substantially at its minumum value;
  inversely controlling the step of supplying pressurized inlet air in accordance with pressure variations of enriched air in the tank; and
  shutting off flow of enriched air through said supply conduit during the intermediate portions of said first and second intervals;
  whereby purging of said chamber occurs periodically.

* * * * *